United States Patent
Gonzalez

(10) Patent No.: US 10,099,785 B1
(45) Date of Patent: Oct. 16, 2018

(54) DRONE WITH RING ASSEMBLY

(71) Applicant: Oswaldo Gonzalez, Tamarac, FL (US)

(72) Inventor: Oswaldo Gonzalez, Tamarac, FL (US)

( * ) Notice: Subject to any disclaimer, the term of this patent is extended or adjusted under 35 U.S.C. 154(b) by 0 days.

(21) Appl. No.: 15/659,563

(22) Filed: Jul. 25, 2017

(51) Int. Cl.
*B64C 39/02* (2006.01)
*B64D 47/08* (2006.01)
*B64D 7/00* (2006.01)

(52) U.S. Cl.
CPC .............. *B64C 39/024* (2013.01); *B64D 7/00* (2013.01); *B64D 47/08* (2013.01); *B64C 2201/027* (2013.01); *B64C 2201/108* (2013.01); *B64C 2201/121* (2013.01); *B64C 2201/127* (2013.01); *B64C 2201/128* (2013.01)

(58) Field of Classification Search
CPC . B64C 27/20; B64C 39/001; B64C 2201/108; B64C 2201/027
See application file for complete search history.

(56) References Cited

U.S. PATENT DOCUMENTS

| | | | | |
|---|---|---|---|---|
| 5,575,438 A * | 11/1996 | McGonigle | ............ | B64C 39/024 244/118.1 |
| 6,955,324 B2 * | 10/2005 | Tanielian | .............. | B64C 39/024 244/3.13 |
| 7,032,861 B2 * | 4/2006 | Sanders, Jr. | ............ | B64C 27/12 244/12.1 |
| 7,149,611 B2 * | 12/2006 | Beck | ..................... | B60K 17/046 244/171 |
| 9,004,973 B2 * | 4/2015 | Condon | .................. | A63H 13/00 446/37 |
| 9,529,086 B2 * | 12/2016 | Taoka | ..................... | G01N 15/06 |
| 2004/0094662 A1 * | 5/2004 | Sanders, Jr. | ............ | B64C 27/20 244/12.5 |
| 2010/0328169 A1 * | 12/2010 | Collette | .................... | B64C 1/36 343/705 |
| 2015/0290348 A1 * | 10/2015 | Taoka | ....................... | A61L 9/22 422/22 |
| 2016/0200415 A1 * | 7/2016 | Cooper | .................. | A63H 27/12 244/17.15 |
| 2017/0029097 A1 * | 2/2017 | Matsumoto | ........... | B64C 27/006 |
| 2017/0073070 A1 * | 3/2017 | Xing | ..................... | B64C 39/024 |
| 2017/0126935 A1 * | 5/2017 | Tai | ....................... | H04N 5/2252 |

* cited by examiner

*Primary Examiner* — Philip J Bonzell
*Assistant Examiner* — Michael B Kreiner
(74) *Attorney, Agent, or Firm* — Sanchelima & Associates, P.A.; Christian Sanchelima; Jesus Sanchelima

(57) ABSTRACT

Disclosed is an unmanned aerial vehicle (UAV) with a pre-defined shape to deploy one or more items. The unmanned aerial vehicle (UAV) includes an upper housing, a lower housing, and a power unit. The upper housing includes plurality of rotors to lift and propel the unmanned aerial vehicle (UAV). Further the unmanned aerial vehicle (UAV) includes various electronic components such as plurality of electronic cards, a processing unit, a Global Positioning System (GPS), a communication unit, an electronic gyroscope, a barometer, engines and flight control system, video camera, a forward looking infrared (FLIR) device, a microphone, and a laser telemeter/designator/range finder. The power unit powers the aforementioned electronic components. The lower housing includes plurality of storage units to stores one or more items. The lower housing is removably attached with the upper housing in a way to deploy the items at a predetermined location through plurality of openings.

15 Claims, 5 Drawing Sheets

DRONE WITH RING ASSEMBLY

TECHNICAL FIELD

The present invention is generally related to an unmanned aerial vehicle (UAV), particularly to a recoverable unmanned aerial vehicle (UAV) with a pre-defined shape to deploy one or more items.

BACKGROUND

Traditionally usage of unmanned aerial vehicle UAV's such as quadrotors, by users is limited to entertainment as toys or as hobbyist collector items. Recently, however, UAV's have been used for personal photography and videography and many other commercial applications. Further, the military personnel are also utilizing unmanned aerial vehicles or drones in situations where manned aerial vehicles are considered too risky or difficult. The UAVs provide military personnel with a round the clock monitoring of the target area.

However, the existing UAVs function in specified environmental conditions because of various limitations such as extreme temperature, weather conditions, obstructions etc. Further the existing UAVs have technical limitations as well. For instance, most UAVs expose the propellers to the external side, allowing for environmental factors and obstacles to harm the UAV.

Further the existing UAVs are not capable enough to store items and then deploy those items to the targeted area. Additionally, most of the existing for military purposes only provide intelligence, surveillance and reconnaissance (ISR) functions, whose sensors send the information to command centers to make decisions. This brings with it a delay in the execution of the actions that must be taken instantly. Therefore, a recoverable unmanned aerial vehicle (UAV) is required to counter the limitations mentioned above. Further there is also a need of an unmanned aerial vehicle (UAV) which can initiate the combat operation within 10-15 seconds.

Further limitations and disadvantages of conventional and traditional approaches will become apparent to one of skill in the art through comparison of described systems with some aspects of the present disclosure, as set forth in the remainder of the present application and with reference to the drawings.

SUMMARY OF THE INVENTION

An unmanned aerial vehicle (UAV) with a pre-defined shape to deploy one or more items is provided substantially, as shown in and/or described in connection with at least one of the figures, as set forth more completely in the claims.

According to the embodiments illustrated herein, an unmanned aerial vehicle (UAV) with a pre-defined shape to deploy one or more items is provided. The unmanned aerial vehicle (UAV) includes an upper housing, a lower housing, and a power unit. The upper housing includes plurality of rotors to lift and propel the unmanned aerial vehicle (UAV). Further the unmanned aerial vehicle (UAV) includes various electronic components such as plurality of electronic cards, a processing unit e.g. a CPU, a Global Positioning System (GPS), a communication unit, an Inertial Measurement Unit (3 axis gyroscopes, accelerometer, magnetometer, compass, and barometer), engines and flight control system, a video camera, a forward looking infrared (FLIR) device, a microphone, and a laser telemeter/designator/range finder.

The power unit powers the aforementioned electronic components. The lower housing includes plurality of storage units to stores one or more items. The lower housing is removably attached with the upper housing in a way to deploy the items at a predetermined location through plurality of openings. Further a software application is provided with the present unmanned aerial vehicle (UAV). This software application utilizes the GNC mechanism i.e. Guidance, Navigation and Control to communicate with the unmanned aerial vehicle (UAV).

The present unmanned aerial vehicle (UAV) is utilized as an Unmanned Combat Aerial Vehicle (UCAV) that provides tactical support to the troops, whose operator runs the vehicle from a remote terminal. The present unmanned aerial vehicle (UAV) is a self-propelled precision-guided munition system with others particular features that give it a high degree of usability and effectiveness in the battlefield.

The present unmanned aerial vehicle (UAV) provides an advanced tactical information in real time through electro-optic (Gimbaled HD Video Camera and Infrared Camera) and lasers, to allow commanders to make better decisions, and troops perform pertinently and accurately. The Intelligence, Surveillance and Reconnaissance (ISR) capabilities provided by present unmanned aerial vehicle (UAV), decreases unpredictable events and uncertainty, therefore, material and human losses.

Further the present unmanned aerial vehicle (UAV) suppress the tactical objectives of the enemy through the fire power provided by the Plug and Play warhead installed in the structure body. The lower housing which is an explosive section can be high explosive lined with large amount of sharp shrapnel, incendiary explosive, smoke etc. By programming and sensors, the "Armed" status is set up at safety distance.

The present unmanned aerial vehicle (UAV) acts immediately and instantly when the situation has required, launching or dropping the warhead off and then return automatically or manually to the launching base or on the other hand, acting like a missile, destroying by itself and the objective.

Further, the present unmanned aerial vehicle (UAV) percolates, infiltrates, penetrates enemy lines and any difficult to access locations, sneaky up and silently way: camps, convoys, ammunition deposits, fuel deposits, air force bases, sniper nests, houses, buildings, parking lots, etc. Distracts, disrupts, or delay an opposing force, facilitating another type of attack, at day and night.

Additionally, the present unmanned aerial vehicle (UAV) automatically navigates routes, access locations or attack objectives preset or preplanned, guided by Global Positioning System (GPS). Operators can Hold up the running of the present unmanned aerial vehicle (UAV) as it flies, at any point, suspending it in the air, manually or automatically, to wait, observe, go down, go up, go by sides, sneak into the trees and buildings at very low speed and height, and even turn it to Standby Mode, that means the present unmanned aerial vehicle (UAV) can turn off its engines over the ground or other surface while observe and watch over, and then hunt fast at 50 mph at the precise moment.

It is well known the increasingly use of UAV's in the entire world, even by the insurgents, so the present unmanned aerial vehicle (UAV), when are equipped with warhead payload, will hunting and destroy them, and will be well resisting electronic counter measures. In addition, the plug and play payload of the present unmanned aerial vehicle (UAV) should be substituted by other elements like Improvised Explosive Device (IED) detectors, ammunitions, sensors, small radars or any other devices to be used in electronic warfare like hunting and take over other drones through manipulating the communication protocols being used by its original operator, meaning, hacking the drone, as well as jamming their communications. It will play an important support to the troops when using other unmanned aerial vehicle (UAV).

Missions like surveillance in crowded civil events, require "more eyes" on the subject, so the Plug and Play payload can be equipped with four high resolution, wide angle and potent telephoto lenses for video and infrared cameras: front, rear and sides, that the command centers will have a better and wide view of the scenario, both in land and in the air.

The present unmanned aerial vehicle (UAV) designed in such a way that it can assure a high performance at any environment, such as desert, jungle, alpine or urban scenes, on high or low temperatures.

These features and advantages of the present disclosure may be appreciated by reviewing the following description of the present disclosure, along with the accompanying figures wherein like reference numerals refer to like parts.

BRIEF DESCRIPTION OF DRAWINGS

The accompanying drawings illustrate the embodiments of systems, methods, and other aspects of the disclosure. Any person with ordinary skills in the art will appreciate that the illustrated element boundaries (e.g., boxes, groups of boxes, or other shapes) in the figures represent an example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate, not limit, the scope, wherein similar designations denote similar elements, and in which.

DETAILED DESCRIPTION

Figure 1:
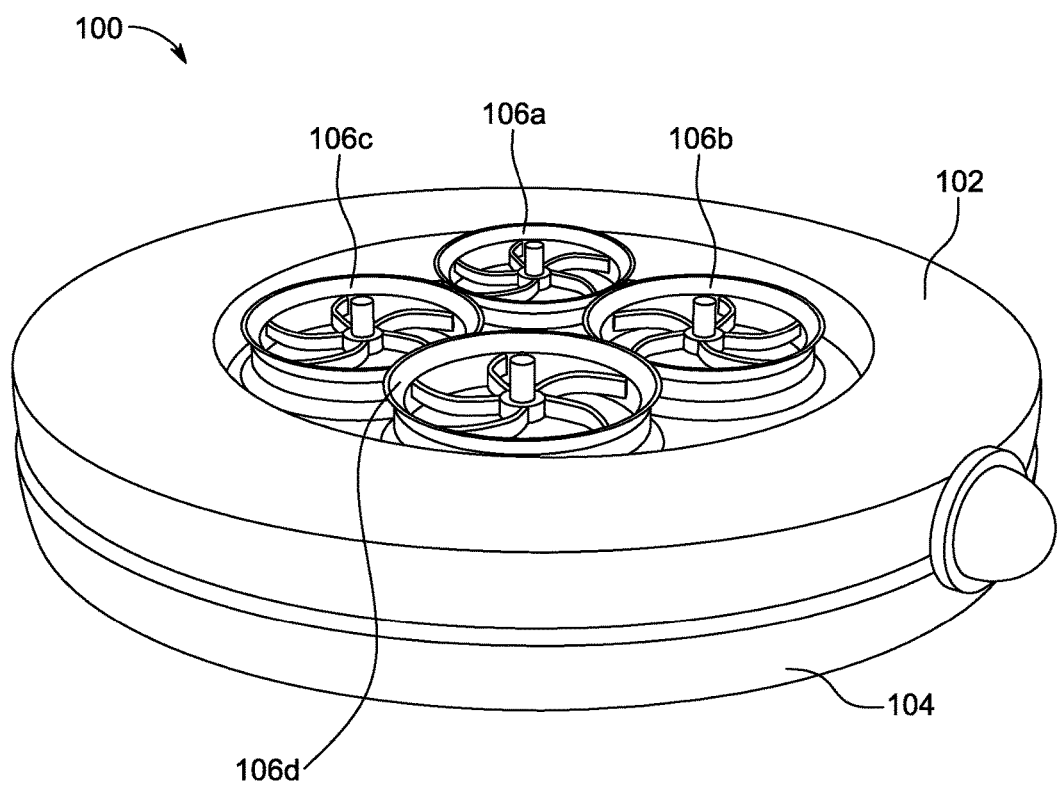
FIG. 1 illustrates a general view of the unmanned aerial vehicle (UAV) with a pre-defined shape to deploy one or more items, in accordance with at least one embodiment.

The present disclosure is best understood with reference to the detailed figures and description set forth herein. Various embodiments have been discussed with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

References to "one embodiment", "at least one embodiment", "an embodiment", "one example", "an example", "for example", and so on indicate that the embodiment(s) or example(s) may include a particular feature, structure, characteristic, property, element, or limitation, but not every embodiment or example necessarily includes that particular feature, structure, characteristic, property, element, or limitation. Furthermore, repeated use of the phrase "in an embodiment" does not necessarily refer to the same embodiment.

Unless defined otherwise, all technical and scientific terms used herein have the same meaning as commonly understood by one of the ordinary skills in the art to which this invention belongs. Although any method and material similar or equivalent to those described herein can also be used in the practice or testing of the present invention, the preferred methods and materials have been described. All publications, patents, and patent applications mentioned herein are incorporated in their entirety.

It is noted that as used herein and in the appended claims, the singular forms "a", "and", and "the" include plural referents, unless the context clearly dictates otherwise. In the claims, the terms "first", "second", and so forth are to be interpreted merely as ordinal designations; they shall not be limited in themselves. Furthermore, the use of exclusive terminology such as "solely", "only", and the like in connection with the recitation of any claim element is contemplated. It is also contemplated that any element indicated to be optional herein may be specifically excluded from a given claim by way of a "negative" limitation. Finally, it is contemplated that any optional feature of the inventive variation(s) described herein may be set forth and claimed independently or in combination with any one or more of the features described herein.

All references cited herein, including publications, patent applications, and patents, are hereby incorporated by reference to the same extent as if each reference were individually and specifically indicated to be incorporated by reference, and were set forth in its entirety herein.

The recitation of ranges of values herein is merely intended to serve as a shorthand method of referring individually to each separate value falling within the range, unless otherwise indicated herein, and each separate value is incorporated into the specification as if it were individually recited herein.

FIG. 1 illustrates a general view of the unmanned aerial vehicle (UAV) 100 with a pre-defined shape to deploy one or more items, in accordance with at least one embodiment. The unmanned aerial vehicle (UAV) 100 includes an upper housing 102, and a lower housing 104. The upper housing 102 includes plurality of rotors 106a, 106b, 106c, and 106d to lift and propel the unmanned aerial vehicle (UAV) 100. In a preferred embodiment, the upper housing 102 includes four rotors 106a, 106b, 106c, and 106d. Thus, the lift of the present unmanned aerial vehicle (UAV) 100 is generated by the four rotors 106a, 106b, 106c, and 106d. The four rotors 106a, 106b, 106c, and 106d acts as vertically oriented propellers.

Further the unmanned aerial vehicle (UAV) 100 includes various electronic components such as a processing unit e.g. a CPU, a Global Positioning System (GPS), a communication unit, an Inertial Measurement Unit (3 axis gyroscopes, accelerometer, magnetometer, compass, a barometer), engines and flight control system 410 (shown in FIG. 4), a video camera 108 (shown in FIG. 4), a forward looking infrared (FLIR) device 404 (shown in FIG. 4), a microphone, and a laser telemeter/designator/range finder 402.

As the present unmanned aerial vehicle (UAV) 100 is an autonomous vehicle, the GPS enables the user to control the navigation. Autonomous flights are created by establishing the GPS waypoints on the user's computing units such as a computer, a tablet or smartphone. The electronic gyroscope senses the angular velocity of the present unmanned aerial vehicle (UAV) 100. In an exemplary embodiment, 3 and 6 axis gyro stabilization technology provides the navigational information to the engine and flight control system enables the present UAV 100 safer to fly.

The barometer acts as a pressure sensor to measure the altitude of the present unmanned aerial vehicle (UAV) 100. The pressure sensors detect the change in the air pressure when the present UAV 100 moves a few centimeters. In an embodiment, the configuration of the video camera 108 (shown in FIG. 4) is HD1080P or 4K resolution and provides distance pattern guide.

The processing unit processes the information captured by the video camera, infrared camera, microphone and GPS. Further the processing unit transmits the processed information to the communication unit. Thereafter the communication unit communicates the received information to the remotely placed Individual Operation Device (IOD) to be recorded and screened, or to the computing units such as a computer, smartphone, laptop etc. The forward looking infrared (FUR) camera is a thermographic camera that senses infrared radiation emitted from a heat source to create an image assembled for video output. Further the microphone may capture the audio signal transmitted from the target objects when the present unmanned aerial vehicle (UAV) 100 is operating in Standby Mode, and then communicates the same to the processing unit.

Figure 2:
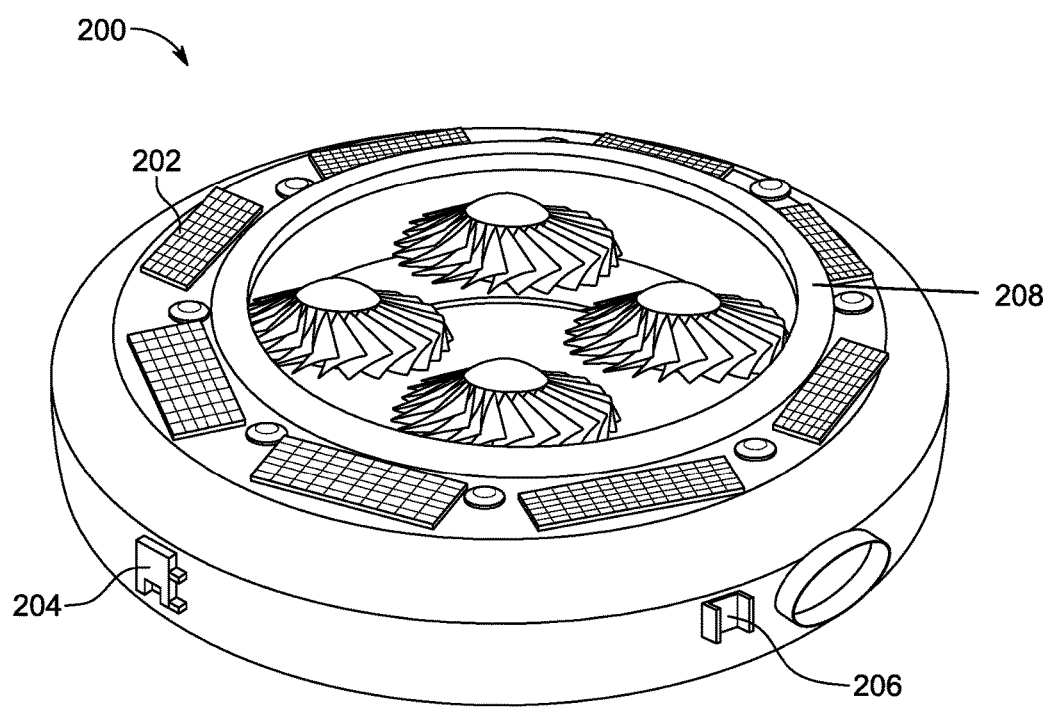
FIG. 2 illustrates a top view of the present unmanned aerial vehicle (UAV), in accordance with at least one embodiment.

Further, the laser telemeter 402 (shown in FIG. 4) utilizes the laser beam to determine the distance to the target object as well as designates targets to be destroyed by other military units. The unmanned aerial vehicle (UAV) 100 includes a compartment to store a power unit 304 (shown in FIG. 3) such as a Lithium ion battery to power the aforementioned electronic components. The power unit is of ring shape and installed in the unmanned aerial vehicle (UAV) in such a way that the access to the power unit is easy for the user. In one embodiment, the power unit triggers sufficient power to lift and impulse the unmanned aerial vehicle (UAV) 100 in conjunction with the built-in solar panels films 202 (shown in FIG. 2). FIG. 2 illustrates a top view 200 of the present unmanned aerial vehicle (UAV) 100, in accordance with at least one embodiment. FIG. 2 is explained in conjunction with FIG. 1. The load release device 204 enables the present unmanned aerial vehicle (UAV) 100 to release the items loaded into the lower housing 104. The present unmanned aerial vehicle (UAV) 100 can be operated by only one person under combat or on the desk at the command center, also it can be performing as joined attack force, through special sensors such as FMS (Follow Me Sensor) 206 located at the front and rear side of the present unmanned aerial vehicle (UAV) 100 and programming, several unmanned aerial vehicles (UAV) 100 can follow each other, forming a powerful group of unlimited units multiplying its effectiveness. Further, the FMS (Follow Me Sensor) 206 also work as Anti-collision Sensor avoiding obstacles.

The lower housing 104 includes plurality of storage units to stores one or more items. The lower housing 104 is removably or detachably attached with the upper housing 102 in a way to deploy the items at a predetermined location through plurality of openings. Examples of the one or more items include but not limited to explosive units, medicines, pesticides, food, water, spare parts etc. Further the present unmanned aerial vehicle (UAV) 100 includes at least one ring-shaped antenna 208 located at the inner edge end surrounding the rotors to make two ways connection with the Individual Operation Device (IOD) and communicate instructions and data transfer. This special design of the antenna 208 allow the present unmanned aerial vehicle (UAV) 100 be more resistant to the intricate electronic environment in the battlefield.

Figure 3:
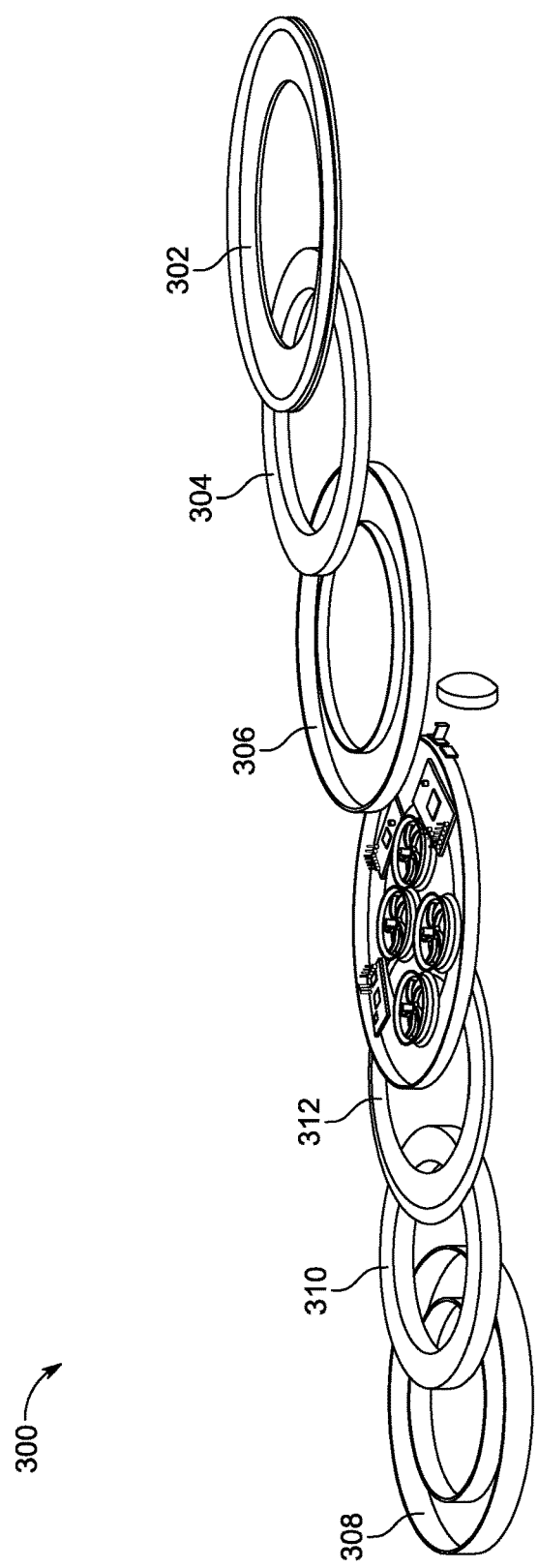
FIG. 3 illustrates an exploded view of the present unmanned aerial vehicle (UAV) with a pre-defined shape to deploy one or more items, in accordance with at least one embodiment.

FIG. 3 illustrates an exploded view 300 of the present unmanned aerial vehicle (UAV) 100 with a pre-defined shape to deploy one or more items, in accordance with at least one embodiment. The present unmanned aerial vehicle (UAV) 100 includes a battery lid 302, a power unit (battery) 304, a battery bed 306, a loading bed 308, items to be loaded 310, and a load unit lid 312. In an exemplary embodiment, the explosive unit includes a large amount of the sharp shrapnel. The unmanned aerial vehicle (UAV) 100 has a detach mechanism which enables the user to separate the explosive unit after deployment of the explosives at the desired location. The explosive unit may be activated by at least two ways. First is, through the IOD—Individual Operation Device/Video Recording, and its GNC software application, setting the time in the electronic timer placed inside the lower housing in which the explosive will be detonated after the payload is dropped off or launched. By the same way, users may activate or trigger explosive unit immediately, without the payload having been dropped off or launched, acting like a missile, destroying itself and the target. Further, the aforementioned explosive unit may be detonated by contact, through sensors placed inside the lower housing, activating by users through the said Individual Operation Device. The second way is, activating the explosive unit manually by the users, separating it from the upper housing in order to be used as a land mine or utility explosive. In an embodiment, the timer unit is composed of time adjusting pad with its screen, power unit, and a central processing unit with timer and radio receiver. Since the time to detonation after been dropped off or launched is calculated automatically by the GNC software according to the flying height, it can be adjusted at any moment in seconds, minutes or hours directly in the lower housing when necessary. The weight of the explosive unit is approximately 3 kilograms. Further the explosive unit is non-sensitive, and easy to handle explosive such as plastic explosive (C4 or composition C4), Semtex, HMX, Octanitrocubane, Incendiary Warhead, etc.

Figure 4:
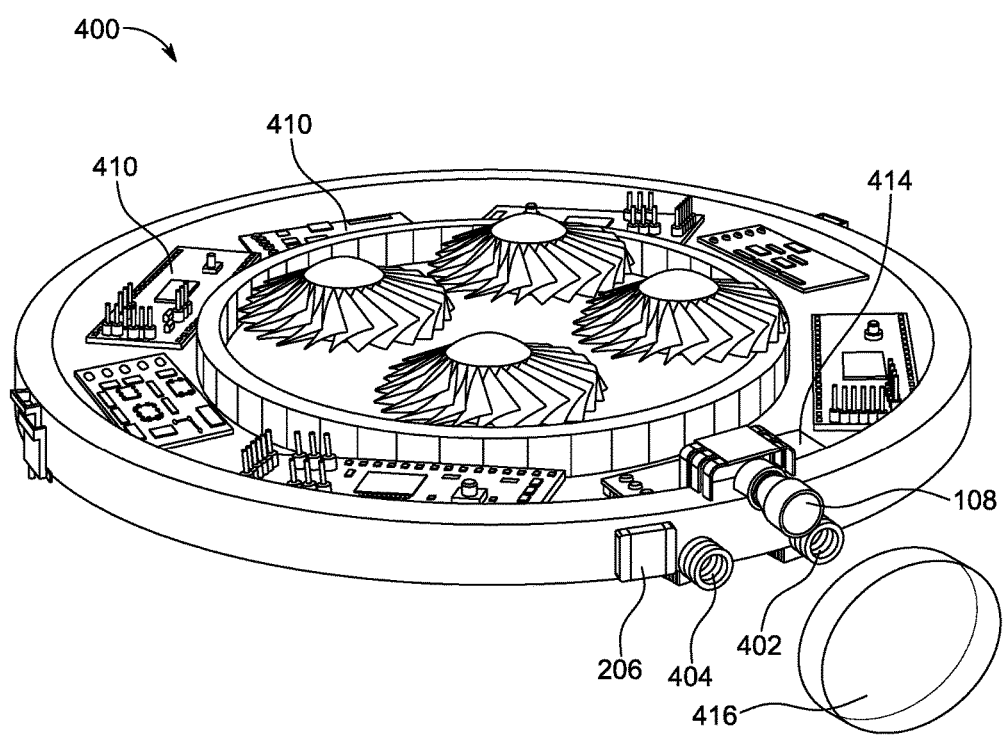
FIG. 4 illustrates a front perspective of the present unmanned aerial vehicle (UAV) with a pre-defined shape to deploy one or more items, in accordance with at least one embodiment.

FIG. 4 illustrates a front perspective 400 of the present unmanned aerial vehicle (UAV) 100 with a pre-defined shape to deploy one or more items, in accordance with at least one embodiment. FIG. 4 shows the placement 414 of the processing unit e.g. a CPU, the communication unit, and the Inertial Measurement Unit—IMU (magnetometer, gyroscope, barometer, compass). Further the FIG. 4 shows the protective dome 416 of the present unmanned aerial vehicle (UAV) 100. In an embodiment, the unmanned aerial vehicle (UAV) 100 is remotely operated and may return to the place from where the unmanned aerial vehicle (UAV) 100 has launched in case the energy level of the battery reaches to a threshold value. This recoverable feature allows the present UAV 100 to automatically return to the point from which it took off in emergency situations like loss of signal from the controller or battery level dropping too low.

Figure 5:
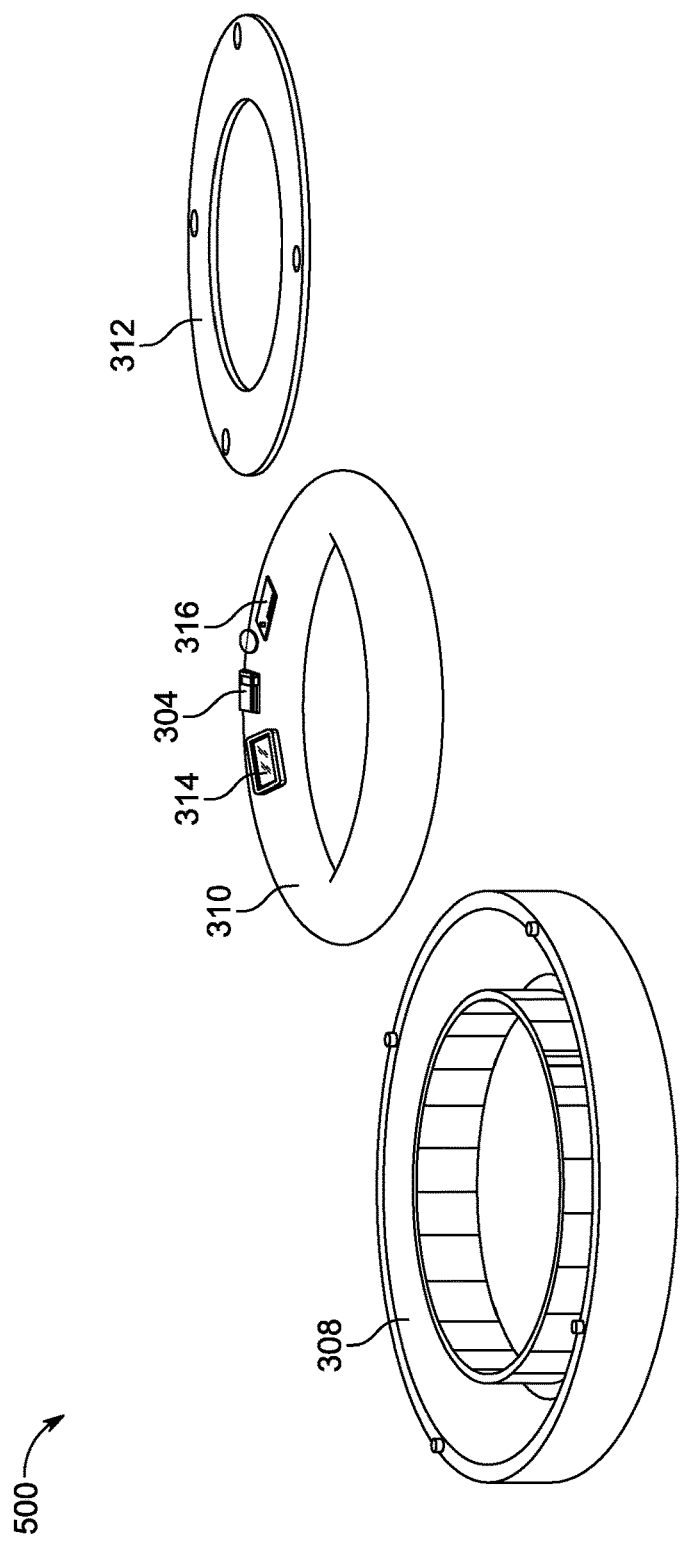
FIG. 5 illustrates an assembly view of the lower housing, in accordance with at least one embodiment.

FIG. 5 illustrates an assembly view 500 of the lower housing 104, in accordance with at least one embodiment. FIG. 5 is explained in conjunction with FIG. 1. FIG. 5 shows the lower housing 104 which has a pre-defined shape and includes a loading bed 308, items to be loaded 310, and a load unit lid 312. Example of the pre-defined shape includes but not limited to ring shape. The ring shape design enables the present unmanned aerial vehicle (UAV) 100 to provide more balanced operation because the total weight is distributed along the structure and provides enhanced power to lift the unmanned aerial vehicle (UAV) 100 and the explosive unit. FIG. 5 further shows a time adjusting pad with its screen 314, power unit 304, and a central processing unit with timer and radio receiver 316.

Further the present unmanned aerial vehicle (UAV) 100 is speedy as compared to the existing UAVs because of the ring-shaped structure. In a preferred embodiment, the power/weight ratio of the present unmanned aerial vehicle (UAV) 100 is 2:1 or more. The unmanned aerial vehicle (UAV) 100 has a pre-defined diameter of about 11.81 inches (30 centimeters). Further the weight of the unmanned aerial vehicle (UAV) 100 is in between 6 pounds to 9 pounds when the explosive is loaded into the lower housing.

The present unmanned aerial vehicle (UAV) 100 enables the troops to easily assemble/disassemble the components, and further provides efficient logistics operation. Additionally, the present unmanned aerial vehicle (UAV) 100 includes various software algorithms such as flight control and navigation algorithm and tactical unmanned vehicles global operations algorithm. The present unmanned aerial vehicle (UAV) 100 further includes flight control and display unit such as video recording with bar reading system and helmet flight display. In an embodiment, a backpack may carry at least two of the present unmanned aerial vehicle (UAV) 100 and four power units.

Thus, the present unmanned aerial vehicle (UAV) 100 is lethal and acts as quadcopter which has a maximum speed of approximately 50 miles per hour. Further the present unmanned aerial vehicle (UAV) 100 has a maximum flight time of at least two hours and control range is about 5 to 6 miles (8-9 Kilometers).

The advantages of the present unmanned aerial vehicle (UAV) 100 includes but not limited to cost effectiveness, submersible, light weight, resistant to extreme lower and higher temperature. Further the present unmanned aerial vehicle (UAV) 100 is autonomous and operable in extreme weather conditions. The present unmanned aerial vehicle (UAV) 100 is operable by one or two users with an Individual Operation Device (IOD) and has ability to penetrate to reach the locations silently. Additionally, the present unmanned aerial vehicle (UAV) 100 provides high performance communications and can be operated through a command desktop.

A software application is provided with the present unmanned aerial vehicle (UAV) 100. This software application utilizes the GNC mechanism i.e. Guidance, Navigation and Control to communicate with the unmanned aerial vehicle (UAV) 100.

Guidance refers to the determination of the desired path of travel (the "trajectory") from the vehicle's current location to a designated target, as well as desired changes in velocity, rotation and acceleration for following that path. Further, navigation refers to the determination, at a given time, of the vehicle's location and velocity (the "state vector") as well as its attitude. Furthermore, control refers to the manipulation of the forces, by way of steering controls, thrusters (rotors, in this case), etc., needed to execute guidance commands whilst maintaining vehicle stability.

The aforementioned software application is design especially for the present unmanned aerial vehicle (UAV) 100 as a military device. This software application includes a user interface to display the individual operation device/video recording with bar code reading system, the "Status" of the drone: "Flying-Unarmed", "Flying-Armed", "Standby", "Payload Dropped" and "Detonated". Also, the present software application displays the common information about the Guidance, Navigation and Control such as speed, altitude, course, orientation, temperature, humidity and the global position, provided by the GPS unit.

In conjunction with the Laser Telemeter, the present software application provides a Distance Pattern, that is a group of colored lines that will allow the operators to have a more accurate idea of the approximation of the target, and the best moment/location to drop the payload or detonate it.

In an exemplary embodiment, each of the present unmanned aerial vehicle (UAV) 100 is "designated" with an identification number or a Code Bar Tag. The designation of the present unmanned aerial vehicle (UAV) 100 allows the logistic and inventory control, explosives control and allow commanders and chiefs to management the resources in any scenario.

Commercially, this software application comes with the present unmanned aerial vehicle (UAV) 100 when is purchased the first time. Further, the above mentioned GNC software application will be sold separated from the Gathering, Control and Sharing advanced software application (GaCoS/AA). The GaCoS/AA is a tactical unmanned vehicles global operations application. The costumers will have the option to acquire GaCoS/AA as strategic information tool or acquire only the regular GNC software application.

Through the Gathering, Control and Sharing Advanced App (GaCoS/AA) each of the present unmanned aerial vehicle (UAV) digitally interlinked with other UAV units and commands, communicating vital information of the battle theater to make decisions and assign resources in front of the circumstances.

GaCos/AA also provides information of the location and altitude of all tactical drones in a determined area, allowing take more control of the air space avoiding accidents among the friend flying vehicles. When this advanced software application will be used by civil aeronautical authorities, will provide an excellent source of control and surveillance for the continuing raise of use of the commercial and civil drones. If any user wants to see specific information about the present unmanned aerial vehicle (UAV) 100, they just need to touch the point on the screen of their Global Situational Screen, desktop, tablet, cellphone or any other device, and present unmanned aerial vehicle (UAV) 100 will show all the aforementioned information. Further this GaCoS/AA will be design with open architecture to allow make some adaptations to the specific needs of the users.

The flight control system and display device provides an IOD (Individual Operation Device/Video Recording) with bar code reading system. The IOD is part of the GNC system (Guidance, Navigation and Control). The IOD acts as a transmitter of the actions the users want the present UAV 100 to do. It is a device that allows the pilots to control the aircraft wirelessly; the commands are received by a radio receiver which is connected to the flight controller.

The video and the navigation data can be read out from a LCD monitor incorporated to the device flight control unit. Before turn the engines on, the bar code tag of the present UAV 100 must be scanned by the IOD and once it is received, operators send the command to turn on and start flying.

Further the users should scan the present UAV 100 and carry it OFF in the backpack, so it can be used immediately when they be needed. The IOD has a built-in Electronic Recording Device (SSHD: Solid State Hard Drive) that preserves the recent history of the flight through the recording of parameters collected of the events in which the scanned present UAV 100 has taken part, similar to the existing Black Box of the commercial aircrafts. This data can be down loaded trough a USB port, and the video data can be recorded and sharing through a Memory Card port. This fact works well to keep control of the inventory and logistic, control of the explosives, investigation and training. GaCoS/AA supports and complements the monitoring function with the IOD, since it sends all the data to the Command Center automatically in real time.

Further the aforementioned flight control system includes a FPV (First Point of View Goggle/Headset). The First-person view (FPV), also known as remote-person view (RPV), or simply video piloting, is a method used to control a radio-controlled vehicle from the driver or pilot's view point. Most commonly it is used to pilot a radio-controlled aircraft or other type of unmanned aerial vehicle (UAV). The present UAV 100 can be operated watching and reading out the information from the IOD screen or using FPV Goggle/Headset, and will specially be used to acquire a better view in the ISR missions (intelligence, surveillance and reconnaissance). The FPV Goggle/Headsets acquires a vital importance when it is used by the special operations troops, for example, in the night missions, where the luminosity of the LCD's screen can reveal their presence.

This FPV Goggle/Headset will offer HD 960×1080 1080p display, wide 70-degree field of vision, Head Tracking that allow the camera's gimbal to tilt up and down and pan left and right, HDMI connectivity, High Sensitivity, Built-in Front Camera and on-screen display (OSD) to readout the navigation data.

There are various applications of the present unmanned aerial vehicle (UAV) 100 which includes but not limited to surveillance in the battlefield to avoid ambushes, locating and neutralizing snipers, as well as support to locate raptors and kidnappers in the civil society. Further the applications of the present unmanned aerial vehicle (UAV) 100 includes locating and destroying pre-assigned targets and the lower housing 104 can also be utilized as land mine or utility explosive since it can be stuck to vertical surfaces through double-faced glued sticker tag. The timer located in the aforementioned lower housing 104 of the present unmanned aerial vehicle (UAV) 100 can be setting in seconds, minutes or even hours according to the needs. The present unmanned aerial vehicle (UAV) 100 can be used in naval applications.

Furthermore, the present unmanned aerial vehicle (UAV) 100 can assist police officers on hunting and persecutions. The present unmanned aerial vehicle (UAV) 100 also locates and disables light weight vehicles, radars and antennas. Additionally, the present unmanned aerial vehicle (UAV) 100 locates fire and natural disaster victims. The present unmanned aerial vehicle (UAV) 100 assists the user on geographical and agricultural researches.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms enclosed. On the contrary, the intention is to cover all modifications, alternative constructions, and equivalents falling within the spirit and scope of the invention, as defined in the appended claims. Thus, it is intended that the present invention cover the modifications and variations of this invention, provided they are within the scope of the appended claims and their equivalents.

What is claimed is:

1. A drone comprising, a ring assembly having an opening at its center defining an interior space surrounded by an upper ring member, at least four rotors entirely within said interior space, a lower ring assembly including a base ring, and an intermediate ring is placed over said base ring.

2. The drone of claim 1 wherein a top ring is placed above said intermediate ring, thereby sandwiching said intermediate ring between said base ring and said top ring.

3. The drone of claim 1 wherein said ring assembly includes a camera mounted thereon.

4. The drone of claim 3 wherein said ring assembly includes an outer wall, said camera mounted to said ring assembly and extending outwardly from said ring assembly and away from said outer wall.

5. The drone of claim 3 wherein said camera is housed within a protective dome.

6. The drone of claim 1 wherein said upper ring assembly includes a camera mounted thereon.

7. The drone of claim 6 wherein said camera is housed within a protective housing.

8. The drone of claim 7 wherein said protective housing is a dome.

9. The drone of claim 1 wherein said intermediate ring is a load to be carried by said drone.

10. The drone of claim 9 wherein said load is water, explosives, a battery, life-saving or military equipment, supplies, and/or a weapon.

11. The drone of claim 10 further including a battery, timer, and/or an information receiving unit.

12. The drone of claim 1 wherein a ring-shaped antenna is mounted adjacent to said upper ring member.

13. The drone of claim 1 further including a ring-shaped power unit.

14. The drone of claim 1 wherein said ring assembly includes a top surface, said rotors having a topmost distal portion, said topmost distal portions being flush or under said top surface to protect the rotors.

15. The drone of claim 1 wherein said lower ring assembly is a loading unit.

\* \* \* \* \*